W. I. TWOMBLY.
MOTOR VEHICLE.
APPLICATION FILED JAN. 26, 1911.
1,089,024.
Patented Mar. 3, 1914.
3 SHEETS—SHEET 1.
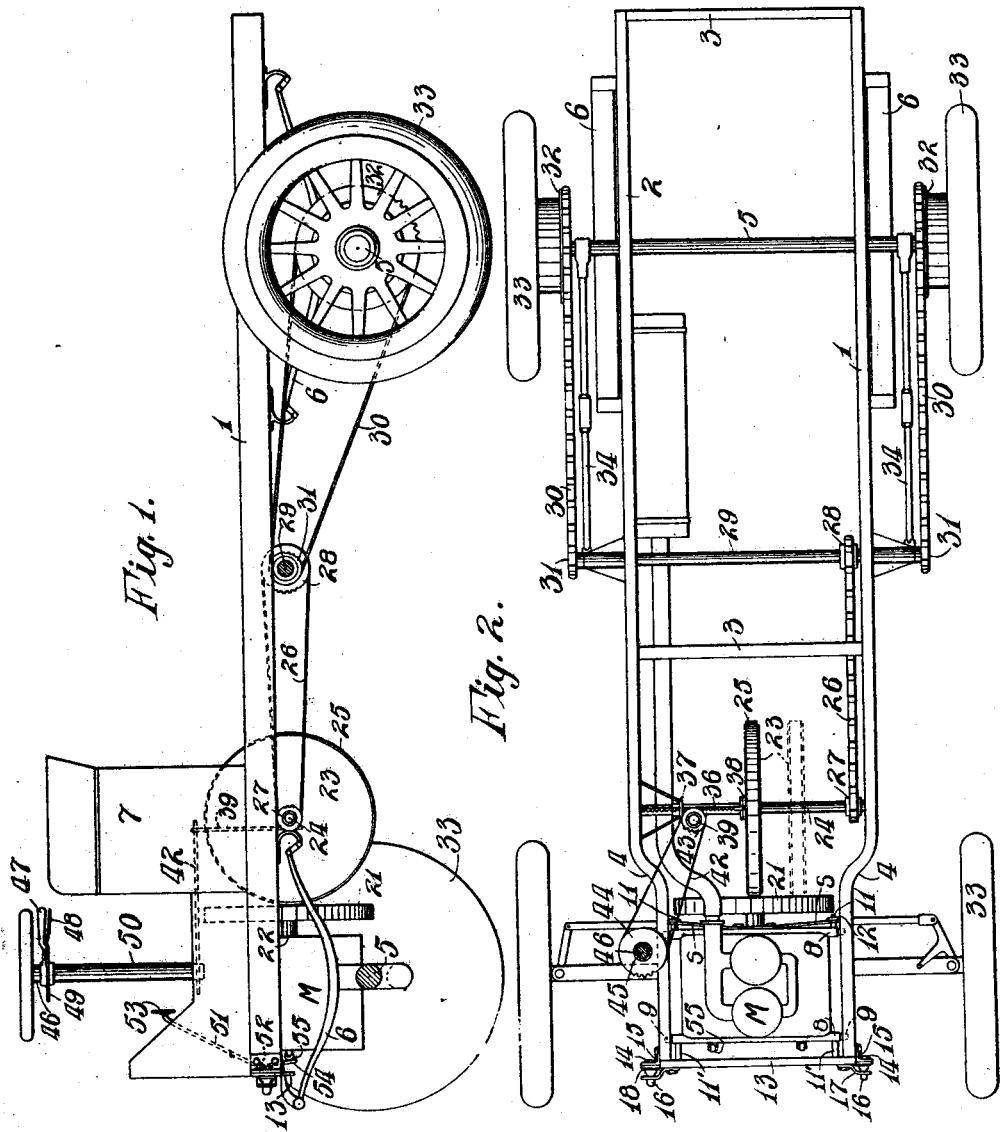
WITNESSES:
Howard E. Thompson
Percy A. Smith
INVENTOR:
Willard Irving Twombly.
BY
John O. Seifert.
ATTORNEY W. I. TWOMBLY.
MOTOR VEHICLE.
APPLICATION FILED JAN. 26, 1911.
1,089,024.
Patented Mar. 3, 1914.
3 SHEETS—SHEET 2.
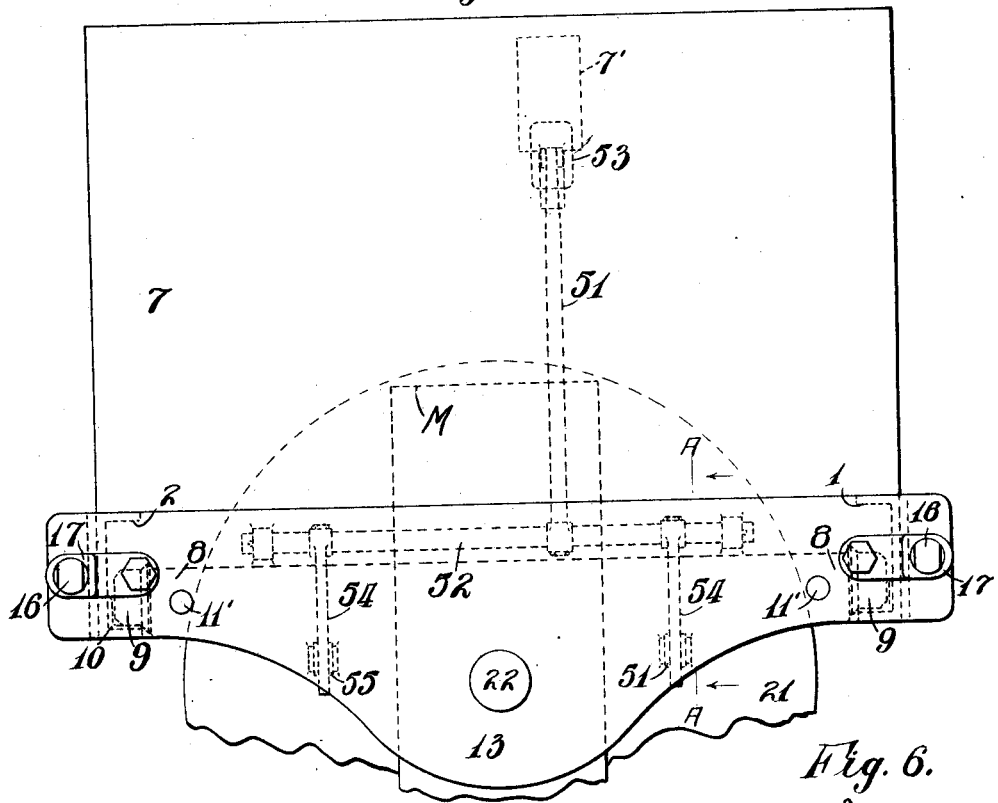
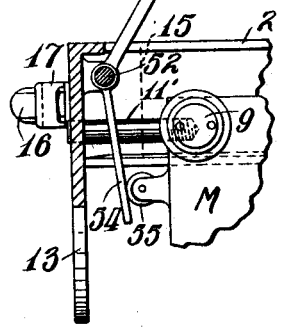
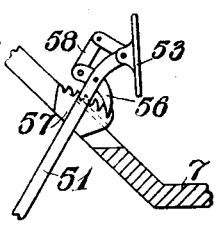
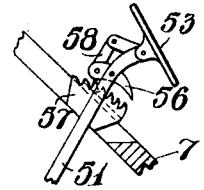
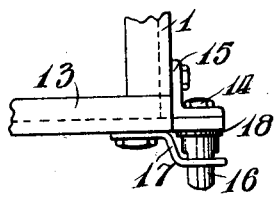
WITNESSES:
Howard L. Thompson
Percy A. Smith
INVENTOR:
Willard Irving Twombly.
BY John O. Seifert
ATTORNEY

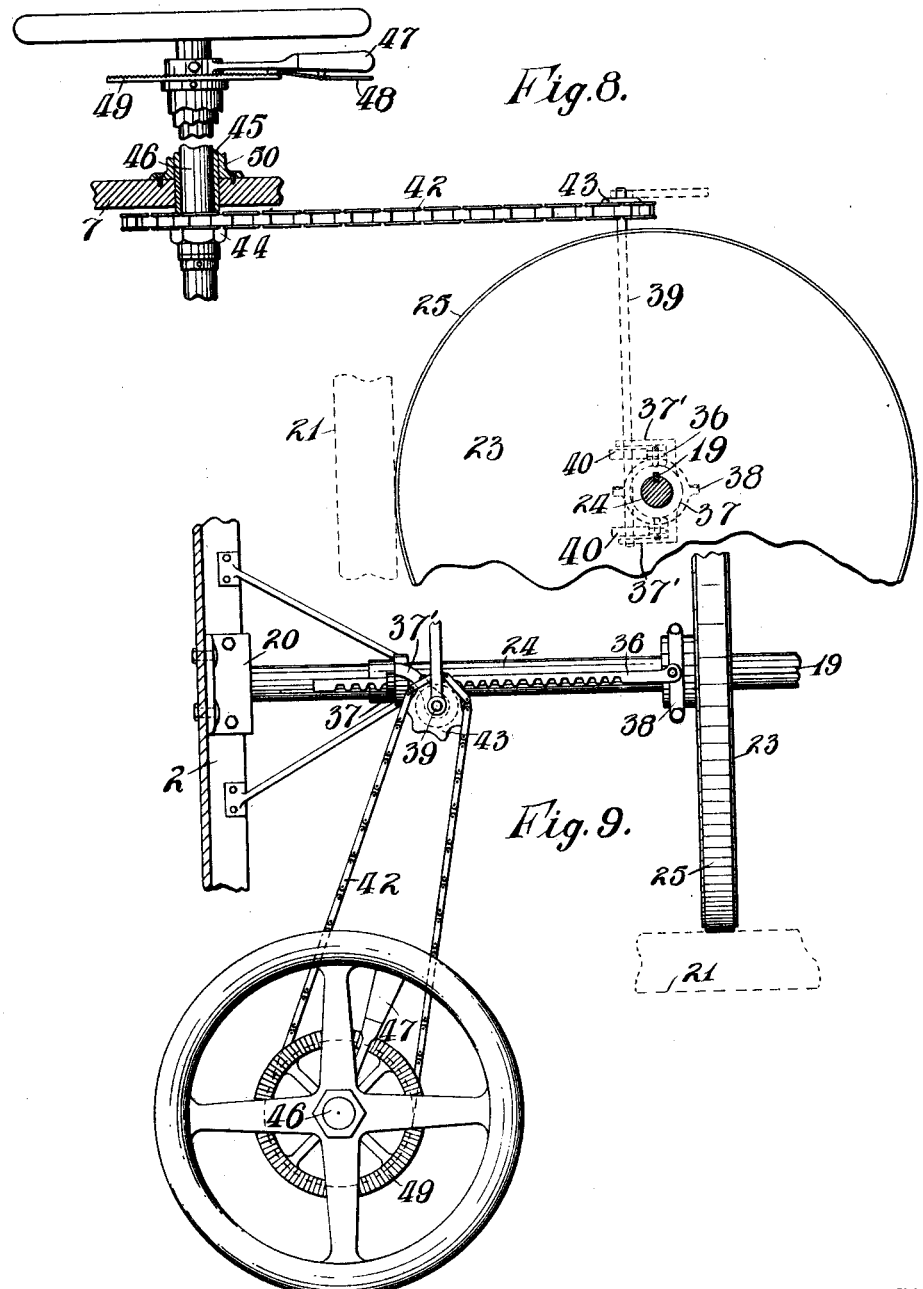

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

MOTOR-VEHICLE.

1,089,024.

Specification of Letters Patent. Patented Mar. 3, 1914.

Application filed January 26, 1911. Serial No. 604,729.

*To all whom it may concern:*

Be it known that I, WILLARD IRVING TWOMBLY, a citizen of the United States, residing in the borough of Manhattan, in the city, county, and State of New York, have invented new and useful Improvements in Motor-Vehicles, of which the following is a specification.

This invention relates to motor vehicles, and it is the object of the invention to provide an improved manner of controlling the driving means, comprising a driving element, such as a motor and a fly wheel fixed to the motor shaft mounted in the chassis frame to have to-and-fro movement, whereby to throw the fly wheel into and out of operative relation with a power-transmitting element to couple and uncouple the motor with the driving wheels of the vehicle, the power-transmitting element being adjustable whereby to change the direction and speed of the driving wheels.

A further object of the invention is to so mount the motor in the chassis frame that it may be readily and quickly removed for the purpose of making repairs or the substitution of another motor, and as readily placed in position in the frame.

With these objects in view I construct the frame of the chassis so that the motor or engine may be readily and quickly rolled in from the front of the frame and have a limited to-and-fro movement therein, the fly wheel of the motor serving as a friction drive wheel and also as one member of a clutch to couple the motor with the driving wheels. The means to effect relative changes of speed and direction between the motor and drive wheels consists of a driven wheel mounted on and adjustable along a shaft with its axis transverse to the axis of the motor, the periphery of which wheel is adapted to frictionally engage with the face of the fly wheel; the said wheel also serves as the other member of the clutch to couple the motor to the drive wheels. Suitable means are provided to adjust said wheel along its shaft and lock it in its adjusted positions. The power is transmitted from said driven wheel shaft to the driving wheels through a counter shaft and sprocket wheels and chains. A spring or springs normally maintains the motor in inoperative position toward the front of the vehicle frame with the fly wheel out of engagement with the driven wheel, and lever mechanism, including a foot pedal, is provided to impart motion to the motor to throw and lock the friction fly wheel into operative relation with the driven wheel.

In the drawings accompanying and forming a part of this specification, Figure 1 is a side elevation of a motor vehicle with my improved driving mechanism applied thereto. Fig. 2 is a plan view of the parts shown in Fig. 1, with the body and the lever mechanism to impart rearward movement to the motor removed, the steering wheel post being shown in section. Fig. 3 is a front elevation to illustrate the manner of mounting and maintaining the motor in position in the frame, and the lever mechanism to impart rearward movement to the motor to throw the fly wheel into operative relation with the driven wheel and couple the driving and driven elements. Fig. 4 is a sectional detail side elevation taken on the line A—A, Fig. 3, of the lever mechanism to impart rearward movement to the motor, a portion of the motor only being shown. Figs. 5 and 6 are detail side elevations of the means to lock the lever mechanism in its different positions. Fig. 7 is a fragmentary plan view to illustrate the means to maintain the motor in position and which also carries the lever mechanism to impart rearward movement to the motor. Fig. 8 is a detail side elevation, partly in section, to illustrate the means to adjust the friction driven wheel along its shaft; and Fig. 9 is a plan view of the parts shown in Fig. 8.

Similar characters of reference designate like parts throughout the different views of the drawings.

In the drawings I have shown my improved driving mechanism as carried by the chassis frame of a motor vehicle of usual construction, comprising side bars 1, 2, of channel iron connected by cross-bars 3, and bent inwardly at the forward end, as at 4, so that the frame at this end will be of less width than the rear and permit of a short turning radius, said frame being supported upon the wheel axles 5 by springs 6, and carrying the body 7.

A readily and quick removable driving element, in the present instance consisting of an internal combustion engine, (designated in a general way by M,) the frame of which has laterally projecting hanger 11a arms 8 at the front and rear with rollers 9 thereon to engage in the channel portion of the side bars 1, 2, whereby the motor is mounted in the frame, is adapted to be rolled into and out of the same, and to have a limited to and fro rolling movement therein. The side bars 1, 2 may be provided with a piece of angle iron 10 upon which the rollers run, and which also serves to strengthen the said bars.

To maintain the motor firmly in position in the frame and yet permit a free and easy to-and-fro movement therein, it is provided with alining pins 11 projecting from the rear of the motor frame to engage in openings in lugs 12 fixed to the chassis frame, and alining pins 11' projecting from the front of the motor frame to engage in openings in a releasable bar or plate 13 extending across the front of the chassis frame, the said plate being releasably secured by means of bolts 14 passing through lugs 15 fixed to the frame members 1, 2 and also passing through the projecting ends of the plate, nuts 16 in the form of a cap having a screw threaded engagement with said bolts to draw and lock the plate in position, the said nuts being carried by offset brackets 17 fixed to the front plate, the nuts being of such length as to always project through said brackets and provided with a flange 18 to permit of a limited movement between the bracket 17 and the plate 13 to prevent the loss or misplacing of said nuts when the plate is removed. The said nuts are also provided with oppositely flattened portions for the application of a wrench or the like.

A friction drive wheel 21 is fixed to the power shaft 22 of the motor, the said wheel serving as the fly wheel of the motor and also to couple the latter with the driving wheels of the vehicle. The face of the wheel 21 is adapted to frictionally engage with the periphery of a driven wheel 23 mounted on a shaft 24, journaled in brackets 20 fixed to the side bars 1, 2, (Fig. 9,) with its axis transverse to the axis of the motor, the said wheel rotatable therewith and adjustable along the same to effect relative changes of speed and direction between the motor and drive wheels of the vehicle. The periphery of the said wheel 23 may be provided with a suitable friction material, in the present instance in the form of a band 25 of fiber or the like. To permit of the sliding or adjusting of the wheel 23 along the shaft 24 and rotate therewith, the shaft has a key or spline 19 (Figs. 8 and 9) to engage in a keyway in the said wheel. Power is transmitted to the drive wheels of the vehicle from the shaft 24 by means of a chain 26 passing around a sprocket wheel 27 on the shaft 24 and a sprocket wheel 28 on a countershaft 29, and chains 30 passing around sprocket wheels 31 on the ends of the shaft 29 and sprockets 32 on the hubs of the driving wheels 33 of the vehicle. Radius or reach-rods 34 are connected to the countershaft 29 and the rear axle 5 whereby to maintain the axle in proper alinement and to take up any slack in the chains 30.

The mechanism to adjust the wheel 23 along the shaft 24 (Figs. 8 and 9) consists of a pair of racks 36 mounted to have sliding movement in a bracket 37 fixed to the side bar 2 and through which the shaft 24 also passes, and at one end pivotally connected to pins projecting from a collar 38 engaging in an annular groove or recess in the hub of the wheel 23. The bracket 20 fixed to the side member 2 also has openings to permit of the passage of the free ends of the racks 36. Also rotatably carried by an arm 37' integral with said bracket is a vertical shaft 39 to which are fixed pinions 40 to mesh with the racks 36. The shaft 39 is rotated by means of a chain 42 passing around a sprocket wheel 43 fixed on said shaft and a sprocket wheel 44 fixed to a hollow shaft 45 surrounding and rotatively mounted on a steering post 46, which post is connected in any suitable manner to the steering mechanism on the front wheels of the vehicle. On its upper end said shaft 45 is provided with a hand lever 47 and a spring latch 48 to engage with either one of a series of teeth or notches in a circular rack 49 fixed to a tubular post 50 surrounding the hollow shaft 45 and secured to the body 7. (Fig. 8).

The motor is normally maintained toward the front of the chassis frame with the fly wheel 21 out of engagement with the wheel 23 by means of a spring or springs s, (Fig. 2,) in the present instance shown as leaf springs fixed to the motor frame and projecting laterally therefrom to abut against the lugs 12, the springs being provided with a perforation or forked portion for the passage of the pins 11. To impart a rearward movement to the motor to couple it with the driving wheels of the vehicle, by throwing the wheel 21 into frictional engagement with the periphery of the wheel 23 and lock it in such position, I provide a lever 51 fixed to a rock shaft 52 journaled in lugs projecting from the plate 13, the said lever projecting through a slot in the foot-board of the vehicle body 7 and has pivotally secured thereto a foot pedal 53. Also fixed to said shaft 52 are a pair of arms 54 to engage with rollers 55 carried by brackets secured to the motor frame. The motor is locked in its rear position with the wheel 21 in engagement with the wheel 23 by a pawl 56 engaging with a rack 57 secured to the foot-board, the said pawl having a link connection 58 with the foot pedal 53.

For the present purposes I have deemed it necessary to show only so much of the motor and of the chassis frame as will suffice for a clear understanding of the invention, and it will be obvious that in a construction of this character suitable automatic or quick releasable or flexible couplings are provided in the control mechanism, the connection with the source of fuel supply, and the mufflers, as well as with a water cooler when the motor is of the water cooled type.

The operation of my improved driving mechanism is substantially as follows: Assuming the parts to be in the positions indicated in Figs. 1 and 2, with the fly wheel of the motor or friction wheel 21 in frictional engagement with the wheel 23 to couple the motor with the driving wheels of the vehicle, the said wheel 23 being in a plane coaxial with the axis of the motor and no power transmitted through said wheel to the driving wheels of the vehicle. Should it be desired to propel the vehicle forward, the pawl 56 is thrown out of engagement with the rack 57 by slightly rocking the foot pedal 53 on the lever arm 51 when the tension of the spring S will force the motor toward the front of the vehicle frame, and the wheel 21 out of frictional engagement with the wheel 23. The latch 48 is then thrown out of engagement with the rack 49 and the hand lever 47 moved to the left rotating the hollow shaft 45 in the direction of the movement of the hand-lever 47 and imparting a similar rotary motion to the pinion 39 and shaft 40 through the chain 42 causing the racks 36 and the connected wheel 23 to move to the left of the axis of the motor, as shown in dotted lines in Fig. 2. After the wheel 23 has been adjusted to the desired position, which may be indicated on a dial formed integral with the rack 49, the latch 48 is again permitted to engage with the said rack 49 to lock the wheel 23 in such position. Pressure is now applied to the foot pedal on the lever 51 when a rearward movement will be imparted to the motor and the wheel 21 thrown into engagement with the wheel 23, again coupling the motor with the driving wheels of the vehicle. Should it be desired to propel the vehicle backward, the above operations are repeated with the exception that the handle 47 is moved to the right reversing the direction and rotation of the hollow shaft 45 and thereby causing the wheel 23 to be adjusted to the right of the axis of the motor. By engagement of the pins 11 in the openings in the lugs 12, and of the pins 11' in the openings in the plate 13, the motor is held firmly down on the tracks and yet permitted to have a free and easy to-and-fro movement.

Should it be desired to remove the motor for the purpose of making repairs or the substitution of another motor, it is only necessary to unscrew the nuts 16 and pull the plate 13 away from the bolts 16 and the front of the chassis frame and with it the rocker shaft 52 and affixed lever 51 and rocker arms 54, and by raising the plate slightly the foot pedal 53 will readily pass through a slot 7' in the foot board of the vehicle body, when the motor may be rolled out from the front of the frame.

Variations may be resorted to within the scope of my invention.

Having thus described my invention, I claim:

1. In a motor vehicle, the combination with the main frame, of a motor mounted in said frame to have longitudinal to and fro movement therein, said motor adapted to be placed in position in and removed from the front of the frame; a friction driving wheel connected to said motor and movable therewith; a friction driven wheel adjustable transversely to the axis of the driving wheel; lever mechanism to impart movement to the motor to throw the friction driving wheel into and maintain it in engagement with the friction driven wheel; and springs connected to the motor and engaging with lugs on the frame to throw and maintain the motor in position with the friction driving wheel out of engagement with the friction driven wheel when the lever mechanism is released.

2. In a motor vehicle, the combination with the frame of the chassis, of a motor having lateral hanger arms to engage with the side members of the frame and whereby it is carried in said frame to have to and fro movement; a friction drive-wheel fixed to the shaft of the motor and movable therewith; a friction driven wheel the axis of which is transverse to the axis of the motor and adjustable along its axis, the periphery of said wheel adapted to have frictional engagement with the face of the drive-wheel; means to impart rearward movement to the motor to throw the drive-wheel into frictional engagement with the driven wheel and maintain it in engagement therewith; springs operating between the motor and chassis frame tensioned to impart movement to the motor to throw the drive-wheel out of engagement with the driven wheel and maintain it in such position when the means to impart movement to the motor to throw the drive-wheel into engagement with the driven wheel is released; means to adjust the driven wheel transversely to the axis of the drive-wheel to transmit variable forward and reverse velocities thereto; and means to transmit power from the driven wheel to the driving wheels of the vehicle.

3. In a motor vehicle, the combination with the frame of the chassis, of a motor carried by said frame to have to-and-fro movement; a friction drive wheel fixed to the shaft thereof; a driven shaft the axis of which is transverse to the axis of the motor shaft; a friction driven wheel mounted on said shaft to rotate therewith and adjustable along the same, leaf springs, one end connected to the motor frame and the other ends engaging with lugs on the chassis frame to normally maintain the motor in position with the drive wheel out of engagement with the driven wheel; a lever having a foot pedal to impart movement to the motor against the tension of the springs to throw the drive wheel into engagement with the driven wheel; and means to transmit power from said friction wheel shaft to the drive wheels of the vehicle.

4. In a motor vehicle, the combination with the chassis frame, of a motor mounted in the side members of the chassis frame to have to and fro longitudinal movement; a friction drive wheel fixed to the shaft thereof; a shaft journaled in the chassis frame with its axis transverse to the axis of the motor; a friction driven wheel mounted on said shaft to rotate therewith and adjustable along the same; lever mechanism connected to the motor to impart movement thereto to throw the drive wheel into engagement with the driven wheel; means to lock the lever mechanism in such position to maintain the drive wheel in engagement with the driven wheel; springs operative when said locking means are released to automatically impart movement to the motor and thereby throw and maintain the drive wheel out of engagement with the driven wheel; and means to transmit power from the driven wheel shaft to the driving wheels of the vehicle.

5. In a motor vehicle, the combination with the frame of the chassis, of a motor having lateral hanger arms to engage with the side members of the frame and whereby it is carried therein to have a limited to and fro longitudinal movement; a friction drive wheel fixed to the shaft of the motor; a driven shaft the axis of which is transverse to the axis of the motor shaft; a wheel on said shaft to rotate therewith and have sliding movement along the same, the periphery of said wheel adapted to have frictional engagement with the face of the drive wheel; means to impart rearward movement to the motor to throw the drive-wheel into and maintain it in engagement with the periphery of the driven wheel, comprising a rock shaft, a lever having a pivoted foot-pedal fixed to said shaft, a pair of arms also fixed to said shaft, rollers carried on the motor frame with which the latter arms engage, a pawl pivotally connected to the foot-pedal, and a fixed rack with which the pawl engages; and springs fixed to the motor frame and engaging with the chassis frame to normally maintain the motor in position with the drive wheel out of engagement with the driven wheel.

6. In a motor vehicle, the combination with the frame of the chassis, of a motor mounted in the frame to have a limited to and fro movement; a friction drive wheel fixed to the shaft of the motor; a driven shaft the axis of which is transverse to the axis of the motor; a wheel on said shaft, the periphery of which is adapted to have frictional engagement with, and adjustable on its shaft radially of, the drive wheel; means to impart rearward movement to the motor to throw the drive wheel into frictional engagement with the driven wheel, comprising a rock shaft, a lever having a foot-pedal fixed to said shaft, a pair of arms also fixed to said shaft, and rollers carried upon the motor frame with which said latter arms engage; means to lock the motor in position so that the drive-wheel will be in contact with the driven wheel, comprising a pawl pivotally connected to the foot-pedal and engaging with a fixed rack; leaf springs connected to the motor frame to project laterally thereof and engage with lugs on the chassis frame, said springs tensioned to normally maintain the motor in position with the drive-wheel out of engagement with the driven wheel; and alining pins carried by the motor frame and engaging in apertures in the chassis frame to prevent lateral, but permit longitudinal, movement of the motor in the frame.

7. In a motor vehicle, the combination with the chassis frame, of a motor; rollers connected to the motor frame to engage with the side members of the chassis frame whereby the motor is adapted to be rolled into and out from the front thereof and to have a limited to and fro movement therein; a releasable bar extending transversely of the chassis frame to maintain the motor therein; pins carried by the motor frame to engage in apertures in said bar and the chassis frame to prevent lateral movement of the motor, but permit of said to and fro movement; a friction driving wheel fixed to the motor and movable to and fro therewith; a friction driven wheel; lever mechanism to impart movement to the motor and thereby throw the driving wheel into engagement with the driven wheel; springs connected to the motor and engaging with the chassis frame to impart movement to the motor when the lever mechanism is released to throw the driving wheel out of engagement with the driven wheel; and means to transmit power from said driven wheel to the driving wheels of the vehicle.

8. In a motor vehicle, the combination with the chassis frame, of a motor having lateral hanger arms; rollers on the extremities of said arms to engage with the side members of the chassis frame whereby the motor is adapted to be rolled into and out from the front thereof and to have a limited to and fro movement therein; a bar extending transversely across and releasably connected to the end of the chassis frame to maintain the motor therein; pins on the motor frame to engage in apertures in lugs on the chassis frame and in the releasable bar to prevent lateral movement thereof but permit of said to and fro movement; a friction driving wheel fixed to the motor shaft; a friction driven wheel adjustable radially of the driving wheel; springs fixed at one end to the motor frame and the other ends engaging with lugs on the chassis frame, said springs tensioned to normally maintain the motor in its forward position with the driving wheel out of operative relation with the driven wheel; and lever mechanism carried by the releasable bar to impart backward movement to the motor against the tension of the springs to throw the driving wheel into operative relation with the driven wheel and maintain it in such position.

9. In a motor vehicle, the combination with the chassis frame, of a motor having hanger arms to engage with the side members of the frame and whereby it is supported therein to have to and fro movement, a bar extending across the front of and releasably connected to the chassis frame to maintain the motor therein; pins carried at the rear and front of the motor frame to engage in apertures in lugs on the chassis frame and in the releasable bar to prevent lateral movement, but permitting longitudinal to and fro movement, of the motor; a drive wheel fixed to the shaft of the motor; a friction driven wheel, means to impart movement to the motor to throw the drive wheel into operative engagement with the driven wheel and maintain it in such position, comprising a rock-shaft carried by the releasable bar, an upwardly-extending lever fixed to said shaft and having a pivoted foot-pedal, a pair of downwardly-extending arms adapted to engage with the motor frame, a pawl pivotally carried by the upwardly-extending lever and having a link connection with the foot-pedal, and a fixed rack with which said pawl engages; and springs connected to the motor and engaging with the chassis frame tensioned to exert a forward pressure upon the motor so that when the means for imparting movement to the motor to throw the drive wheel into operative engagement with the driven wheel is released, the said springs will impart movement to the motor to uncouple the drive wheel from the driven wheel and maintain it in uncoupled position.

10. A motor vehicle, comprising in combination with the chassis frame, of a motor mounted in the frame to have to and fro movement; a friction drive wheel connected thereto; a shaft journaled in the chassis frame with its axis transverse to the axis of the motor and connected to the driving wheels of the vehicle; a friction driven wheel mounted on said shaft to rotate therewith and adjustable along the same; springs to normally maintain the motor in position with the drive wheel out of engagement with the driven wheel; means to impart movement to the motor against the tension of the springs to throw the driving wheel into and maintain it in engagement with the driven wheel; and means to adjust the driven wheel on its shaft, comprising a pa' of slidable rack bars extending parallel with the shaft one above and the other below the same, a collar loosely mounted in an annular recess in the hub of the driven wheel to which one end of the rack bars are pivotally connected, a rotatable shaft, a pair of pinions on said shaft meshing with said racks, and means to impart rotary motion to the shaft.

11. A motor vehicle, comprising in combination with the chassis frame, of a motor mounted in the frame to have to and fro movement and having a friction driving wheel connected thereto; a friction driven wheel connected to the driving wheels of the vehicle; and means to impart movement to the motor to throw the driving wheel into and maintain it in engagement with the driven wheel, comprising a rock-shaft, an actuating lever fixed to said shaft, and a pair of arms fixed to said shaft and connected to the motor; springs connected to the motor to normally maintain the motor in position with the driving wheel out of engagement with the driven wheel when the means to impart movement to the motor is released.

WILLARD IRVING TWOMBLY.

Witnesses:
JOHN O. SEIFERT,
PERCY A. SMITH.